United States Patent [19]

Hägglund et al.

[11] Patent Number: 4,880,212
[45] Date of Patent: Nov. 14, 1989

[54] DEVICE FOR DETECTING THE LEVEL OF THE SLAG IN A METAL POOL

[75] Inventors: Hans Hägglund, Örsundsbro; Lars Ericsson; Rudolf Wiklund, both of Täby, all of Sweden

[73] Assignee: Geotronics Metaltech AB, Sweden

[21] Appl. No.: 225,620

[22] Filed: Jul. 26, 1988

Related U.S. Application Data

[63] Continuation-in-part of Ser. No. 938,881, Dec. 8, 1986, abandoned.

[30] Foreign Application Priority Data

Sep. 28, 1987 [SE] Sweden .................. 8703728

[51] Int. Cl.⁴ ............................................. C21C 5/28
[52] U.S. Cl. ............................................ 266/94; 266/99
[58] Field of Search .............. 266/78, 94, 99, 100; 73/290 R, DIG. 9

[56] References Cited

U.S. PATENT DOCUMENTS

| | | | |
|---|---|---|---|
| 2,682,026 | 6/1954 | Mesh et al. | 318/31 |
| 2,812,938 | 11/1957 | Mesh et al. | 259/95 |
| 2,836,739 | 5/1958 | Mesh | 318/28 |
| 3,395,908 | 9/1968 | Woodcock | 266/99 |
| 3,663,204 | 5/1972 | Jungwirth | 75/49 |
| 3,708,159 | 1/1973 | De Bay | 266/99 |
| 4,235,423 | 11/1980 | Kemlo | 266/99 |
| 4,354,382 | 10/1982 | Hagglund | 73/290 R |
| 4,732,477 | 3/1988 | Kumbrant | 356/313 |

FOREIGN PATENT DOCUMENTS

| | | |
|---|---|---|
| 79078168 | 9/1979 | Sweden . |
| 0875437 | 8/1961 | United Kingdom . |
| 01224973 | 3/1971 | United Kingdom . |
| 1234791 | 6/1971 | United Kingdom . |
| 01533834 | 11/1978 | United Kingdom . |
| 2136131A | 9/1984 | United Kingdom . |
| 8629268 | 2/1987 | United Kingdom . |

*Primary Examiner*—S. Kastler
*Attorney, Agent, or Firm*—Witherspoon & Hargest

[57] ABSTRACT

The device has a lance. The lance is moved towards said molten bath level. An antenna is provided at a downward end of the lance for coaction with the slag interface (interfaces), when the lance is moved towards the slag interface (interfaces). A sensitive detection circuit is connected to said antenna. The antenna is during its downward movement capacitively coupled to said slag layer, and the detection circuit detects a predetermined impedance change (predetermined impedance changes) at the antenna provided as it is moved towards the interface (interfaces).

10 Claims, 5 Drawing Sheets

DEVICE FOR DETECTING THE LEVEL OF THE SLAG IN A METAL POOL

This is a continuation-in-part of Ser. No. 938,881, filed Dec. 8, 1986, now abandoned.

The present invention relates generally to a device for detecting the level of one or more interfaces or boundary surfaces between material layers in a molten metal bath held in a ladle intended therefor. The interfaces concerned are, for instance, the interface between air and slag and/or between slag and molten metal.

During the manufacture of metal and in particular the manufacture of steel the molten metal from a melt furnace is poured into a container, a so called holding ladle. The ladle thereafter is moved, e.g. on rails, to a nearby located processing station. e.g. for oxygen blasting of the metal. The container typically holds approximately 10 m$^3$ molten metal and it is desirable to be able to fill it to a maximum, predetermined level of molten metal. When the molten metal is poured into the container a layer of slag rises up through the bath and settles on the surface. At present there are no accurate methods available for determining the level of the upper surface of the slag layer, and thereby the maximum filling level. On the other hand there are a number of methods for determining the level of the interface between molten metal and slag. Examples of such devices are disclosed in the U.S. Pat. Nos. 3,395,908 and 4,354,382.

Said U.S. Pat. No. 3,395,908 discloses a lance at the end of which two electrically conductive rods are provided spaced from each other. U.S. Pat. No. 4,354,382 discloses a lance with an inductive probe for determining the interface between slag and molten metal. By providing two inductive sensors axially spaced along the lance, one can compare the signals from the two sensors when the lance is immersed into the melt, and in this way obtain information about the thickness of the slag layer.

The device according to U.S. Pat. No. 3,395,908 does not function satisfactorily since the measurement results are influenced by deposits, occurring on the electrically conductive rods when they are introduced into the slag layer. Due to the deposits the device cannot be used repeatedly since the electrical resistance between the rods is changed between measurements.

The device according to U.S. Pat. No. 4,354,382 functions satisfactorily, under the condition that the slag layer has a high metal concentration. The accuracy of the measurement is in the order of ±2.5 cm.

The object of the present invention is to provide a device of the above described type, allowing accurate detection of the upper surface of the slag layer with an accuracy being at least ±0.5 cm. Furthermore, the device should be possible to be used repeatedly without impaired measurement accuracy.

The device according to the invention includes an antenna attached to one end of the lance, towards the bath, for analysis purposes, which is movable vertically downwards and a processing circuit connected to the antenna. The lance also carries probes which are operative in determining the extent to which the ladle has been filled, hereinafter referred to as the extent of fill, the composition of the metal bath, the bath temperature, and other parameters.

An object of the invention is to measure the change in impedance at the measuring point of the antenna. The impedance at the antenna measuring point or at the supply point of the supply cable to the antenna will change as the capacity coupling between the antenna and the slag layer increases progressively as the antenna approaches the slag layer.

A further object of the invention is to provide a device which may detect the interfaces between air and slag and between slag and molten metal by the same equipment. When the antenna moves through the slag layer, down towards the metal bath, the capacity of the coupling will again change, this change resulting in a corresponding change in the impedance at said point, which change may, in turn, be measured by the inventive device.

The device according to the invention comprises
a lance.
means coupled to said lance for moving said lance towards said molten bath level,
an antenna provided at a downward end of said lance for co-action with said slag interface (interfaces), when said moving means moves said lance towards said slag interfaces,
a sensitive detection circuit connected to said antenna, said antenna during its downward movement being capacitively coupled to said slag layer, said detection circuit being arranged to detect a predetermined impedance change (predetermined impedance changes) at the antenna provided as said antenna is moved towards the interface.

In accordance with a first embodiment of the invention the antenna carries a hum detector which detects mains hum, i.e. electric fields deriving from electrical cables and like conductors located in the room or area in which the ladle is situated. The method is based on the principle that the capacity of coupling between antenna and slag surface will increase as the antenna approaches the slag surface vertically from above. The hum detector produces a first signal when the antenna comes into contact with the slag surface. The lance may in this embodiment also carry an inductive sensor which is intended to produce a second signal when detecting the interface between the molten metal and the undersurface of the slag layer during continued downward movement of the lance in the bath. These two signals enable the thickness of the slag layer, and therewith also the extent of ladle fill, to be calculated to an accuracy of about ±0.5 cm.

Preferably in this embodiment the hum detector is an electrical circuit of a type used in touch control of illumination. When the antenna is at a distance from the melt no signal is emitted from the detector, but when the tip of the antenna comes to physical contact with the upper surface of the slag layer the detector emits an output signal.

However, the first embodiment of the invention is to some extent sensitive to electric disturbances, and in particular to disturbances occurrent in the electric mains or network. Mains disturbances may be due to the presence of, e.g. mains-operated electric motors, voltage transients occurring when activating and deactivating inductive loads, the use of thyristor-controlled tools etc., these disturbances being captured by the antenna and resulting in wrong measurements.

A further object of the present invention is therefore to provide a device of the aforesaid kind which will enable one or more interfaces or boundary surfaces to be measured reliably, irrespective of disturbances in the mains or like networks.

A second embodiment of the invention therefore includes an oscillator having a frequency which is different the mains frequency, an impedance which is connected between the oscillator output and the antenna or the antenna supply or a bridge coupling the one arm of which includes an additional impedance connected to the reference level of the device and the other arm of which is connected to the antenna or to the antenna supply cable, said detector being a synchronous detector having a reference-signal input which is connected to the oscillator and a measuring-signal input which is connected either to a point on the connection of the impedance with the antenna or with the antenna supply, or is connected to the antenna supply cable, a threshold circuit which is connected to the detector output for supplying an output signal when the antenna is located a given distance from the interface corresponding to a given degree of capacitive coupling between the antenna and the interface.

Preferably the oscillator frequency lies within a range which is considerably higher than the mains frequency.

The impedance circuit may be a series impedance.

The bridge coupling may preferably include a transformer having a primary winding which is connected in series between the oscillator output and the device reference level, and a secondary winding having a centre tap, one end of the secondary winding being connected to the reference level in series with an impedance to the additional input, and the other end of the secondary winding being connected to the antenna or to the antenna supply cable, and the tap being connected to the measuring-signal input of the detector.

The main idea of the second embodiment, which is the preferred one, lies in the provision of an oscillator which supplies the antenna with a frequency which is different to the mains frequency and which can be either higher or lower than said mains frequency. The oscillator frequency is preferably one kHz or higher.

The change in impedance at the antenna supply point is measured with a synchronous detector, which detects the amplitude of the phase component which is co-phase or counter-phase with the reference signal (=the oscillator output signal) and produces an output signal corresponding thereto. The output signal from he synchronous detector is differentiated, compared and converted to pulse form to form a signal wich indicates when the antenna is located at a pre-determined distance from the interface or boundary layer. In the case of one preferred embodiment of the invention, this distance is zero, i.e. there is physical contact between antenna and interface. In accordance with an alternative embodiment this distance may, e.g., be 10 cm.

In both embodiments the lance is preferably fixed in a holder that moves the lance with a constant velocity, e.g. by means of a stepping motor, thus also moving the antenna provided at the tip of the lance down towards the metal bath. In operation downward movement begins from an initial position of the lance, and is halted when the detector emits its output signal. A measure of the level of the slag is obtained from the number of steps the stepping motor has made from an initial predetermined position of the lance high above the surface of the slag down to the position when an output signal from the detection signal indicates that the upper surface of the slag is reached. When the thickness of the slag is to be measured the lance is moved further downwards until an output signal indicates that the metal surface under the slag is reached. The slag thickness is calculated from the difference of the indicated positions of the lance at the two detected surfaces, i.e. the upper surface of the slag and the slag/metal interface, in relation to said initial position.

Instead of using an exposed antenna, being electrically insulated from the lance in accordance with the above, the wiring of the conventional thermocouple can be used as an antenna, said wires being in a conventional way enclosed by a layer of quartz. The whole thermocouple assembly is arranged to protrude from the end surface of the lance and is protected by a metal cover.

The invention will now be described in detail with reference to the drawings in which.

Figures 1, 2:
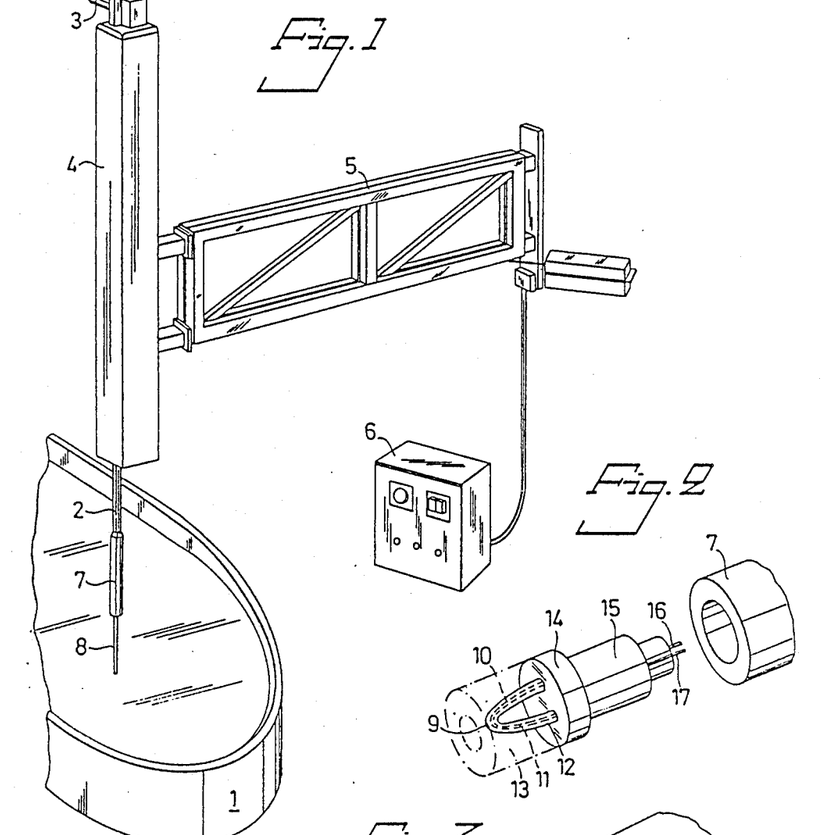
FIG. 1 shows a conventional lance provided with an antenna according to the invention.
FIG. 2 shows the tip of the lance provided with an alternative embodiment of the antenna.

FIG. 1 depicts a typical arrangement with a container 1, a so called holding ladle, being filled with molten metal. On the upper surface of the metal a slag layer is formed, and it is desired to measure the filling degree of the container by measuring the level of the upper surface of the slag layer, by using a conventional lance 2, that is being moved with constant velocity down towards the metal bath by a stepping motor 3. The lance is carried in an elongated housing 4, which by known means is fixed in a frame 5, said frame being pivotable outwards over the container. Control equipment, generally indicated by the numeral 6, controls the movements of the stepping motor. The control equipment 6 also comprises a number of per se known electrical circuits, said circuits being electrically connected with measuring means, said means being provided in and on the lance. Such measuring means are exemplified by thermal couples, inductive sensors, means for measuring oxygen content in the metal bath etc. The lance can also be of the type wherein front portion 7 comprises a sample chamber, to be immersed into the molten bath for taking out a sample. Conventionally the front portion 7 of the lance is a thick-walled cardboard tube.

An antenna 8 of electrically conductive material is provided in the front end surface of the lance and is electrically isolated from the lance. The antenna depicted in FIG. 1 has the shape of a straight rod and is by an electrical wiring (not shown) in connection with a hum detector, provided within the housing 4. The hum detector emits an electrical signal to a signal wiring (not shown) for transmitting it to the control equipment 6, when the capacitive coupling of the antenna 8 to the slag layer successively increases, and the tip of the antenna finally comes into physical contact with the upper surface of the slag layer.

In FIG. 2 an alternative embodiment of the antenna is shown. Here the antenna comprises a conventional thermocouple 9 inserted into the end surface of the front portion 7 of the lance 8. The thermocouple comprises two wires 10, 11 of different material, said wires contacting each other at the tip of the thermocouple. The wires 10, 11 are enclosed in a quartz tube 12. The U-shaped thermocouple 9 formed by elements 10–12 is surrounded by a metal protective housing 13. The protective housing and the thermocouple are carried by a cylindrical body 14 with a neck 15, adapted to be inserted into the front end surface of the lance 2. Reference numerals 16 and 17 relate to electrical conductors adapted to be connected to an electrical cable, extending inside the lance, and being drawn to the control equipment 6. The cable is connected to the hum detector. The output from the detector is on one hand used for calculation of the level of the slag layer and on the other hand for controlling a switch (not shown) which after the emitting of the output performs a switching to connect said cable (not shown) with any of the other measuring means, e.g. a temperature sensor. On continued downward movement of the lance the temperature of the slag layer and the molten bath is measured.

Figure 3:
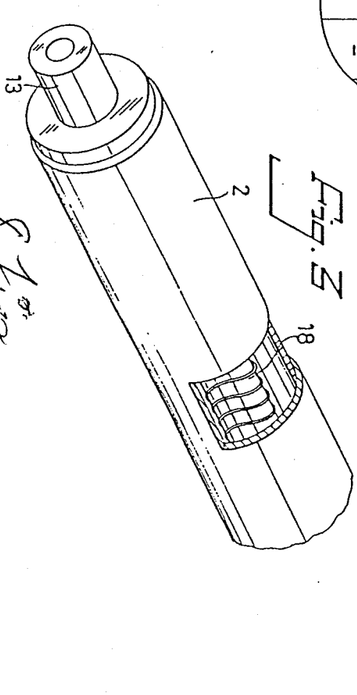
FIG. 3 shows the device according to the invention in combination with an inductive sensor, known per se.

FIG. 3 shows an arrangement similar to FIG. 2, with the addition that the lance has been provided with an inductive sensor 18. When the lance is moved downwards and the antenna is brought into contact with the upper surface of the slag layer, a signal is emitted and transferred to a counter which counts the number of steps performed by the stepping motor 3 based on a reference value whereupon a reading of said number is taken. The lance continues its downward movement whereby the temperature is measured, and when the sensor 18 reaches the interface between the molten bath and slag layer, the inductive sensor in a familiar way outputs a signal to the control equipment 6. At this instant the state of the counter is read again. Based on these two readings the thickness of the slag layer is calculated.

Figure 4:
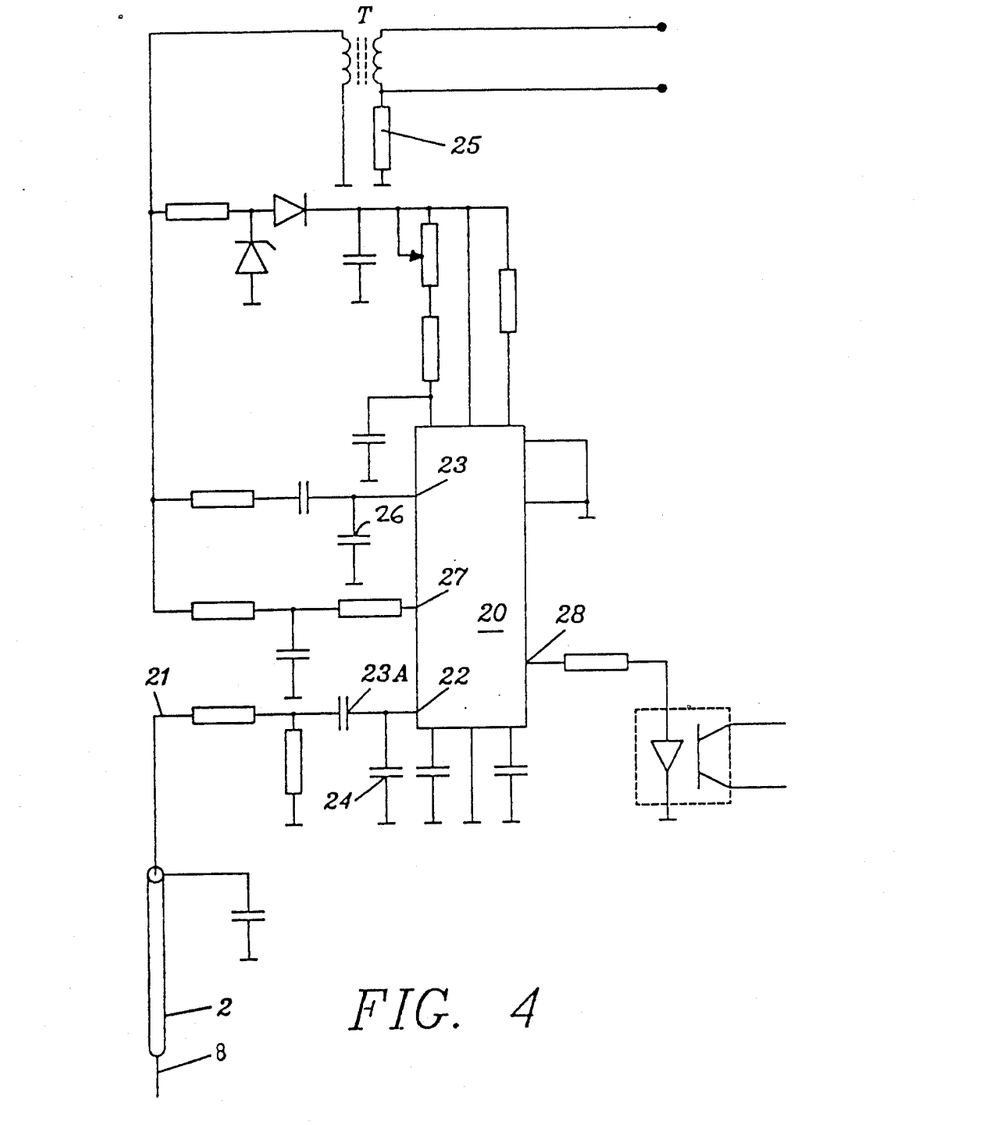
FIG. 4 shows, as a first embodiment, a circuit diagram for detection of an interface surface intended for detection of hum.

FIG. 4 shows a circuit diagram of the hum sensitive detector. In this case the detector is laid out to sense mains hum. The core of the detector is a circuit 20, known per se in connection with touch-control of illumination. The antenna 8 is connected by means of a single conductor 21 to input 22 of the two adaptive inputs 22, 23 of the circuit. A capacitor 23A adapts the circuit 20 for detection of the upper surface of the slag layer. The second capacitor 24 couples the antenna to the same reference level as that of the rest of the circuit 20, and that reference level is generated at the supply voltage source of the circuit, said source comprising a transformer T, the primary side of which is connected between the phase line and the neutral line of the mains, and the secondary side of which is connected to the circuit 20. A resistor 25 between the phase of the mains and ground determines said reference potential, in this case 7.5 V. Thus the antenna 8 is at the same potential as the reference potential, and follows the reference potential in case the mains voltage should fluctuate. The second adaptive input 23 of the circuit is in a similar way connected to the reference potential by means of a capacitor 26. The mains voltage is sensed on the input 23. The circuit also comprises a zero crossing detector, said detector sensing the zero crossings in the alternating voltage on the secondary side of the transformer T, on an input 27. The circuit 20 comprises a clock generator, providing a short internal strobe pulse, coinciding with the positive zero crossings for the voltage on the input 27. The strobe pulse is passed to a control logic included in the circuit 20. The control logic reacts on signals from the antenna input 22 and from the mains detector input 27 only during the strobe interval, i.e. during the positive zero crossings. The control logic compares the signals on the antenna input 22 and on the mains voltage input 23 with each other, only during the strobe interval, and if three consecutive comparisons show that the signals on the input 22 and the input 23 correspond with each other, a true hum signal (measuring signal) is regarded to be at hand, and an output signal is emitted at the output 28 of the circuit 20. Said adaptive inputs 22, 23 brings about the advantage that the sensitivity of the detector automatically is adapted to the hum level prevailing on the antenna. Thereby the detector becomes relatively insensitive to the design of the antenna.

Figure 5:
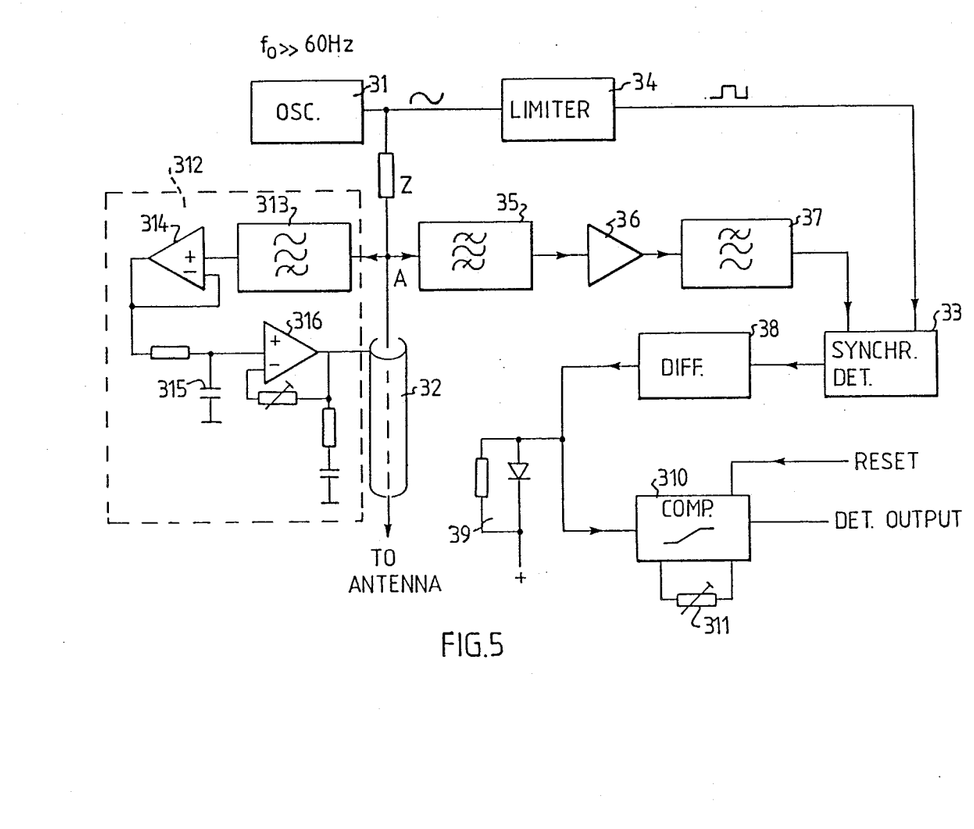
FIG. 5 is a block schematic of a first embodiment of a circuit coupled to the antenna for detecting an interface surface according to the invention.

The second embodiment of the device according to the invention, illustrated in FIG. 5, comprises an oscillator 31, the oscillating frequency of which is in the order of 1 kHz. The oscillator supplies an antenna (not shown) via an impedance circuit Z and a co-axial cable 32, the impedance circuit of the illustrated embodiment having the form of a resistive or reactive series impedance. Preferably, the antenna may have the design shown in FIG. 2.

As the antenna approaches the upper surface of the slag layer, the capacitive coupling between the antenna and said upper surface will change, resulting in a change in impedance at the point A between the series impedance Z and the cable 32.

This means that amplitude and phase position of the oscillator signal, supplied via the series impedance Z at point A will also change. The purpose of the impedance Z is to provide a tap point separated from the oscillator supply point suitable for indication of the effect of an impedance change of the antenna. Changed amplitude and/or phase at the point A in relation to the output of the oscillator 31 is to be indicated in a synchronous detector 33.

The oscillator output signal is used as a reference signal and is transmitted to the synchronous detector 33 via a limitor 34. The purpose of the limitor 34 is to provide a square signal marking the zero passages of the output signal of oscillator 31.

The signal obtained at the point A is fed to the measuring-signal input of the synchronous detector via a band-passfilter 35, an amplifier 36 and a further band-passfilter 37. The band-passfilters are dimensioned to filter out all frequencies that lie on or adjacent to the mains frequency and also frequencies which lie above the oscillator frequency. It is essential to have the narrowest possible bandpass filtering around the oscillator frequency. The filter circuit 35 is required to prevent the amplifier 36 from being overloaded by electrical fields of main frequency captured by the antenna. Thus, instead of being a band-passfilter having its pass-band around the frequency of the oscillator 31 it may as well be a high-pass filter having its cut-off frequency well above the mains frequency (but lower than the oscillator 31 frequency) or a band elimination filter having its band elimination around the mains frequency. Other types of filtering which will fulfil the requirements mentioned above may of course be provided instead. The filtering must be of such a kind that amplitude changes of the signal at the point A appear at the output of the filter.

The synchronous detector 33 is sensitive, or responsive to changes in the amplitude and phase of the oscillator signal at the point A and produces on its output an output signal which corresponds to these changes. The signal at the output of the limitor 34 supplied to the reference input of the synchronous detector 33 may be processed in many ways before the comparison is made to the measuring signal from the filtering circuit 35 to 37. If it is used as it is, i.e. in phase with the oscillator 31 signal, an amplitude difference is mainly indicated. If it is set 90° out of phase, phase difference is mainly indicated. In a phase position there-between a mixed indication of phase and amplitude is made. The essential is that the output of the synchronous detector 33 has a value which is without mixup determined by the signal change in the point A provided by the impedance change of the antenna at the end of the cable 32 owing to the influence from the slag. A very suitable design of the synchronous detector makes use of both a square signal in phase with the oscillator and a signal shifted 90° out of phase.

The output from the filters 35 to 37 is essentially a sinusoidal signal. If the square wave signal from limiter 34 is in phase with the sinusoidal signal and inverts the sinussoidal signal each second half period then a full-wave rectification will be provided. The half period may at will be positively or negatively directed. When the square wave signal is strictly in phase with the sinusoidal signal the whole surface of the sinusoidal signal is provided. Dependent on the amplitude provided, a DC mean value proportional to the amplitude is provided. If instead the square wave signal is 90° out of phase then the sinusoidal signal will have a zero passage in the middle of the square wave period. Thus, a zero signal out of the quadrature will be the result. Then if a small phase change of the sinusoidal signal captured at A is provided then the unbalance between the inputs of detector 33 will be notified as an output. In the circuit shown in FIG. 5 the best performance is provided when the phase deference between the sinusoidal signal at the measuring input of the synchronous detector 33 is about 45°, such that the detector 33 reacts on a combination of amplitude and phase.

The output signal from the synchronous detector 33 is derivated in a differentiating network 38. In principle this network makes a new highpass filtering in some steps in order to derive the fast change of output signal of detector 33 provided by the fast change of capacitance at the antenna provided when the antenna is lowered down to and into the slag. It is to be noted that it is not the capacitance at the antenna in itself that is measured but the capacitance changes. There is also often a slow capacitance change of the antenna, which for instance is dependent on that the capacitance between the conductor and its surroundings in the co-axial cable 32 is changing in the course of time. This should not be detected. Thus, it is the fast capacitance change when the capacitance to a slag interface changes rather abruptly that is detected.

The output of the differentiating network 38 is locked to a given level with the aid of a locking circuit 39. The locking circuit 39 is symbolized by a parallel circuit of a resistor and a diode but may of course have other design apparent for the man skilled in the art.

The synchronous detector 33 has an internal filter filtering out the oscillator frequency and the output of the detector is a DC-signal, that will change its amplitude when the captured signal at A will change as the result of a rather fast impedance change of the antenna. The time constant in the differentiating network 38 may be in the order of 0.1 sec., which is a short time in relation to the slow variation mentioned above.

The output of the network 38 locked to a given level is compared in a comparator 310 with the reference value corresponding to the value of signal obtained when the tip of the antenna comes into physical contact with the upper surface of the slag layer. This reference value can be set by means of a potentiometer 311. The output signal of the comparator 310 indicates that the antenna is in physical contact with the slag layer. The potentiometer can also be adjusted to a setting at which the comparator will produce an output signal when the antenna is located at a pre-determied distance from the upper surface of the slag layer, e.g. a distance of 10 cm.

Before the lance is lowered down to the slag, after it has passed through a possible shutter at the upper part of the ladle the comparator 310 is reset by a reset signal provided from an outer control arrangement, not being a part of the actual invention.

The coaxial cable 32 may have a considerable length, e.g. a length of several meters, depending on the equipment present. The capacitance between the screen, or shield, of the coaxial cable and its inner conductor will be large under these circumstances. In order to eliminate the effect of this capacitance on the measuring result, the inventive device may be provided with a bootstrap-circuit 312, which causes the impedance of the cable screen to follow the impedance of the inner conductor when this impedance varies. The bootstrap-circuit 312 includes a high-pass filter circuit 313, the input side of which is connected to the point A, the output side of which is connected to an operational amplifier 314, the low-impeded output of which is connected to the screen of the coaxial cable 32. The filter circuit 313, which is a high-pass filter is required to prevent the amplifier 314 from being overloaded by electric fields of main frequency captured by the antenna. In order to prevent phase rotation in the filter circuit 313 from affecting the measuring result, there is provided a phase-correction network 315 which restores the phase of the signal fed to the screen of the coaxial cable by the bootstrap-circuit 312. The bootstrap-function is achieved in a known manner, with the aid of the operational amplifier 316 and the illustrated, external components connected thereto.

It is to be noted that the bootstrap-circuit may be omitted.

Figure 6:
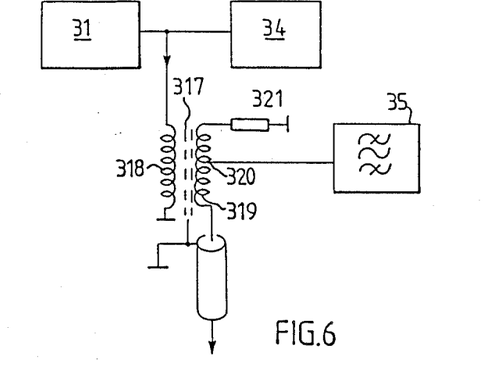
FIG. 6 illustrates an alternative realization of the impedance circuit shown in FIG. 5.

FIG. 6 illustrates an alternative embodiment of the impedance circuit Z in FIG. 1. The impedance circuit of this embodiment comprises a bridge which includes a transformer 317 having a primary winding 318 and a secondary winding 319 with a centre tap 320. The primary winding 318 is connected in series between the oscillator output and the reference level. One end of the secondary winding is connected to the reference level, via a series impedance 321, in this case preferably a capacitor, whereas the other end of the winding is connected to the central conductor of the coaxial cable 32. The centre tap 320 is connected to the band-passfilter 35. The bridge coupling is in balance when the antenna has only a slight capacitive coupling with the slag layer, or no coupling at all. As this capacitive coupling increases, an imbalance signal occurs on the centre tap 320, and the imbalance signal is filtered and then applied to the measuring input of the synchronous detector 33.

Figure 7:
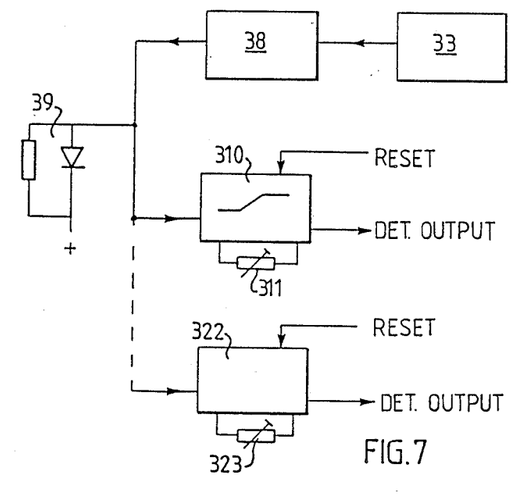
FIG. 7 illustrates diagrammatically a coupling for detecting a plurality of interfaces with the aid of the second embodiment of the inventive device.

In the aforegoing it has been assumed that the inventive device is used to detect the air/slag interface or boundary surface. FIG. 7 illustrates an embodiment in which the slag/metal interface, or boundary surface, is also detected. This is achieved by the provision of a comparator circuit 322. The level at which the comparator circuit 322 switches is set with the aid of a potentiometer 323, such that the circuit 322 will produce an output signal when the antenna is located at a given distance from the slag/metal interface, this distance corresponding to a given degree of capacitive coupling, different to that of the FIG. 5 embodiment, between the antenna and the slag/metal interface.

When the device is to be used for detecting still more interfaces, the requisite number of comparators are incorporated in the manner illustrated by the broken line in FIG. 7.

The degree of capacitive coupling is contingent on the distance antenna surface and the ability of the material layer to conduct electromagnetic fields.

The above described embodiments of the invention can be modified and varied in many ways within the scope of the inventive idea. For example the antenna 38 does not need to be provided on a lance, but can equally well be located at the end of a wire cable, running over a pulley and being lowered until the antenna is brought into contact with the bath.

Figure 8:
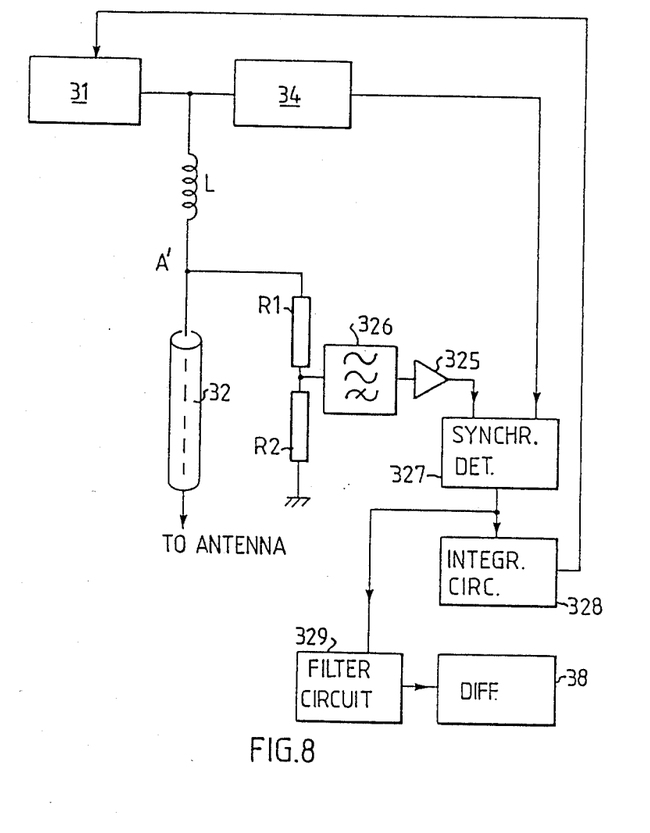
FIG. 8 illustrates an alternative realization of the impedance and synchronous detector circuit shown in FIG. 5.

FIG. 8 illustrates an alternative embodiment to the one shown in FIG. 5, which adapts itself to the existing cable capacitance. The oscillator 31 being a low-resistant, high Q oscillator supplies a series circuit of an inductor L and the cable 32 connected to the antenna. The chosen induction of the inductor L is such that the series circuit is in resonance at the oscillator 41 frequency as long as the lance with the antenna is positioned well above the slag surface. If the series circuit L, 32, antenna has a Q-value about 10 and the supply voltage of oscillator 31 is about 7 V effectively, then the voltage across the capacitance composed by the cable capacitance and the antenna capacitance will be about 70 V effectively. Thus, the cable together with the antenna is supplied with quite a high voltage at the point A'. It is to be noted that the voltage and Q values are mentioned only as examples.

A voltage divider R1, R2 having a high resistance is connected to the point A' in order to divide the voltage at A' down to a voltage suitable not to overload an amplifier 325 provided after a possible high-pass or band-pass filter 326 filtering out the rest of the voltage divided hum signal superposed to the oscillating signal at A'. A suitable voltage at the tap of the divider R1, R2 may be in the order of 1/20 of the voltage at A'. Since the voltage at A' is so high the hum signal provided in the cable 32 will be of very little importance, particularly also because the inductor has a very low impedance for frequency signals and may be neclegted. Therefore, the filter 326 need not be provided. The amplifier 325 is then void as a buffer circuit before the tapped voltage divided signal is fed to the synchronous detector 327. The band-pass filter 37 shown in FIG. 5 is not needed because the series resonance circuit L, 32, antenna is a high Q circuit. The unintegrated circuit from the synchronous detector 327 is fed to a very slow integrating circuit 328, which is so slow that the output from it does not react on the effect on the signal at A' caused by the sudden capacitance change provided when the antenna is moved in the vicinity of and into the slag. The output of the integrating circuit 328 is fed to a control input of the oscillator 31, the oscillator 31 being of a kind changing its oscillating frequency until the control input is brought to zero. By this servo regulation the system shown in FIG. 8 is adaptive to the capacitance of the cable 32 and the antenna, which capacitance may have a slow change in time.

The output of the detector 327 is also fed to a filtering circuit 329, which will filter out the oscillator frequency of the detector output. The output of the filtering circuit 329 is comparable to the output of the synchronous detector 33 in FIG. 5, having the filtering circuit built in, and the differentiating network 38 and the circuitry connected thereafter will be the same as in FIG. 5.

It is to be noted that in this embodiment the reference signal is shifted 90° so that the synchronous detector works in quadrature.

The above described embodiments of the invention can be modified and varied in many ways within the scope of the inventive idea. For example, the antenna 38 does not need to be provided on a lance, but can equally well be located at the end of a wire cable, running over a pulley and being lowered until the antenna is brought into contact with the bath.

We claim:

1. A device for detecting the level of a slag interface in a molten metal bath, said device comprising:
   a lance,
   means coupled to said lance for moving said lance towards said molten bath level,
   an antenna provided at a downward end of said lance for coaction with said slag interface when said moving means moves said towards said slag interface,
   a sensitive detection circuit connected to said antenna, said antenna during its downward movement being capacitively coupled to said slag layer, said detection circuit being arranged to detect predetermined impedance change(s) at the antenna provided as said antenna is moved towards the interface, said detection circuit comprising:
   an oscillator (31) having a frequency which is different from the mains frequency,
   a network supplied by the oscillator and having the antenna and its possible antenna supply (32) in one branch and a tap point (A;20;A') separated from the oscillator supply point and connected to said antenna via an antenna supply cable provided if needed,
   said detector being a synchronous detector having a reference-signal input which is connected to the oscillator (31) and a measuring-signal input which is connected to said tap point,
   that the synchronous detector (33, 38) provides a D.C. output dependent without mistake on the change quality of the continuously existing signal at said tap point indicating the degree of capacitive coupling change between the antenna and the slag, and
   that a threshold circuit (310) is connected to the synchronous detector output for supplying an output signal when the continuously existing signal at said tap point has a predetermined change quality indicating that the antenna is located a given distance from the interface corresponding to a given degree of capacitive coupling between the antenna and the slag.

2. A device according to claim 1, wherein said network includes a series circuit of an impedance (2) and the antenna with its possible supply cable, said tap point being provided between the impedance and the antenna with its possible supply and the free end of the impedance being connected to said oscillator.

3. A device according to claim 1, wherein said network is a bridge coupling (317-321) the one arm of which includes an additional impedance (321) connected to the reference level of the device and the other arm of which is connected to the antenna or to the antenna supply cable.

4. A device according to claim 1, wherein the oscillator frequency lies within a range which is considerably higher than the mains frequency.

5. A device according to claim 3, wherein the bridge coupling (317-321) includes a transformer having
  a primary winding (318) which is connected in series between the oscillator output and the device reference level, and
  a secondary winding (319) having a centre tap (320), one end of the secondary winding being connected to the reference level in series with an impedance (321) to the additional input, and the other end of the secondary winding being connected to the antenna or to the antenna supply cable, and the tap (320) being connected to the measuring-signal input of the detector.

6. A device according to claim 1, wherein the treshhold circuit includes a differentiating circuit (38), the input of which is connected to the output of the synchronous detector and the output of which is connected to a comparator circuit having means for setting the treshhold value so that the output signal is produced when the antenna is located at a pre-determined distance from the interface.

7. A device according to claim 1 intended for measuring the location of two interfaces, wherein the device includes a comparator circuit (322) for each interface to be measured; and in that the input of respective comparator circuits (322) are connected in common to the output of the differentiating circuit (38).

8. A device according to claim 1, further including means (312) for bootstrapping the screen, or shield, of the antenna supply cable (32) such as to eliminate the influence of the screen impedance to earth or to the reference level of the device.

9. A device according to claim 1, further including filter devices (35,37) connected between said common point (A) and the measuring-signal input of the synchronous detector, in order to filter out disturbing signals of mains frequency captured by the antenna and other disturbing frequencies different to the osciallator frequency.

10. A device according to claim 8, wherein said impedance is an inductor and the resonance of said series circuit is tuned to the frequency of said oscillator when said antenna is placed well above the slag surface in said molten metal bath, and wherein said oscillator has a controllably variable frequency, and wherein a servo control means is provided servo-controlling said oscillator frequency to correspond to said resonance frequency of said series circuit as long as the antenna impedance only has slow impedance changes caused by influences from the surroundings.

* * * * *